(12) United States Patent  
Bennett et al.

(10) Patent No.: US 7,699,229 B2  
(45) Date of Patent: Apr. 20, 2010

(54) LAPTOP BASED TELEVISION REMOTE CONTROL

(75) Inventors: James D. Bennett, Prague (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 895 days.

(21) Appl. No.: 11/419,143

(22) Filed: May 18, 2006

(65) Prior Publication Data

US 2007/0162938 A1 Jul. 12, 2007

Related U.S. Application Data

(60) Provisional application No. 60/758,312, filed on Jan. 12, 2006.

(51) Int. Cl.
G06K 7/10 (2006.01)
G06F 17/00 (2006.01)

(52) U.S. Cl. .................................. 235/472.01; 235/375

(58) Field of Classification Search ................. 235/380, 235/381, 383, 375, 492, 486, 385, 472.01, 235/472.02, 472.03; 725/34, 87, 111, 110, 725/35

See application file for complete search history.

(56) References Cited

U.S. PATENT DOCUMENTS 6,292,283 B1 * 9/2001 Grandbois .................. 398/107
6,910,627 B1 * 6/2005 Simpson-Young et al. .. 235/381
7,134,134 B2 * 11/2006 Fries et al. .................... 725/50
2002/0066784 A1 * 6/2002 Segal et al. .................. 235/381
2005/0216933 A1 * 9/2005 Black .......................... 725/34
2005/0216940 A1 * 9/2005 Black .......................... 725/87
2007/0143806 A1 * 6/2007 Pan ............................. 725/111

* cited by examiner

Primary Examiner—Thien M Le
(74) Attorney, Agent, or Firm—McAndrews, Held & Malloy, Ltd.

(57) ABSTRACT

A laptop that interacts with a television system. At least one module may be adapted to receive a user input identifying a video selection. The at least one module may also be adapted to display video information corresponding to the video selection. The at least one module may further be adapted to transmit a control signal adapted to cause the display of video information corresponding to the video selection on the television system. The laptop may, for example, be adapted to receive television system setting information and provide for user control of various television system settings. Also for example, the laptop may be adapted to receive media guide information, present such information to a user, provide for user selection of a media element, and transmit a control signal adapted to cause delivery of the selected media element from a multimedia source to the television system.

22 Claims, 9 Drawing Sheets

LAPTOP BASED TELEVISION REMOTE CONTROL

CROSS-REFERENCE TO RELATED APPLICATIONS/INCORPORATION BY REFERENCE

The present application is related to and claims priority from U.S. Provisional Patent Application Ser. No. 60/758,312, filed Jan. 12, 2006, and titled "LAPTOP BASED TELEVISION REMOTE CONTROL," the contents of which are hereby incorporated herein by reference in their entirety.

The present application is related to U.S. patent application Ser. No. 11/290,974, filed Nov. 30, 2005, titled "PARALLEL TELEVISION REMOTE CONTROL," U.S. patent application Ser. No. 11/290,297, filed Nov. 30, 2005, titled "CONTROL DEVICE WITH LANGUAGE SELECTIVITY," U.S. patent application Ser. No. 11/289,971, filed Nov. 30, 2005, titled "PHONE BASED TELEVISION REMOTE CONTROL," U.S. patent application Ser. No. 11/289,848, filed Nov. 30, 2005, titled "PARALLEL TELEVISION DOCKING ADAPTER, U.S. patent application Ser. No. 11/290,079, filed Nov. 30, 2005, titled "UNIVERSAL PARALLEL TELEVISION REMOTE CONTROL," U.S. patent application Ser. No. 11/419,140, filed May 18, 2006, titled "PARALLEL TELEVISION BASED MEDIA RECORDING," U.S. patent application Ser. No. 11/419,152, filed May 18, 2006 concurrently herewith, titled "PARALLEL TELEVISION BASED VIDEO SEARCHING," and U.S. patent application Ser. No. 11/419,146, filed May 18, 2006 concurrently herewith, titled "PARALLEL TELEVISION BASED MEDIA INTERACTION," each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Present invention relates to controlling selection and delivery of broadcast channels to a television through interaction with the television, set top box and channel broadcasting source.

2. Description of the Related Art

A typical remote control (or "Remote" as used herein) has multiple predefined buttons. A Remote is used to change TV ("Television") channels, change audio and video settings of the TV and control power supply to the TV by selecting one or more of the buttons. A Remote interacts with TV in one direction. A remote generally sends control signal to a TV using infrared or RF transmission. The control signal triggers the TV to implement the changes. An unobstructed view between the Remote and the TV is typically needed when infrared transmission is used. The Remote can however interact with the TV through obstructions like furniture and walls when RF transmission is used. The type of transmission used to send the control signal determines the maximum allowable distance between the Remote and the TV. The maximum allowable distance in both the cases is typically only a few meters.

A remote is used for changing or scanning TV channels when channels are being broadcast. It is not possible to view a TV channel that has already been broadcast some time earlier with the help of a typical Remote.

A user uses multiple buttons of a Remote to control settings and display of media on a TV screen. The user gets visual information from the screen of the TV, makes a choice and presses the buttons to realize the choice. Operating a Remote may be inconvenient, because a user needs to look back and forth between the Remote buttons and the TV screen to complete a task.

A TV generally receives channels either directly or indirectly via a set top box from a broadcaster. Many types of media systems are used to provide supplemental or alternate video to the TV. Many of these media systems directly source locally accessed media, and others alternatively or in addition provide television broadcast tuners for managing television channel selection and video and audio settings. Exemplary media systems include cable and satellite set top boxes and DVD (Digital Video Disk) players. Each of these media systems is controlled through direct interaction or via a Remote. To interact with a user via a Remote, media systems deliver information via a TV's screen and speakers and receive information directly from the Remote. Again, as previously mentioned, such interaction usually requires a user to look back and forth between the Remote and the TV screen in attempts to locate buttons and understand the Remote's operation.

Further limitations and disadvantages of conventional and traditional approaches will become apparent to one of ordinary skill in the art through comparison of such systems with various aspects of the present invention.

BRIEF SUMMARY OF THE INVENTION

A laptop that interacts with a television system and/or media source, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
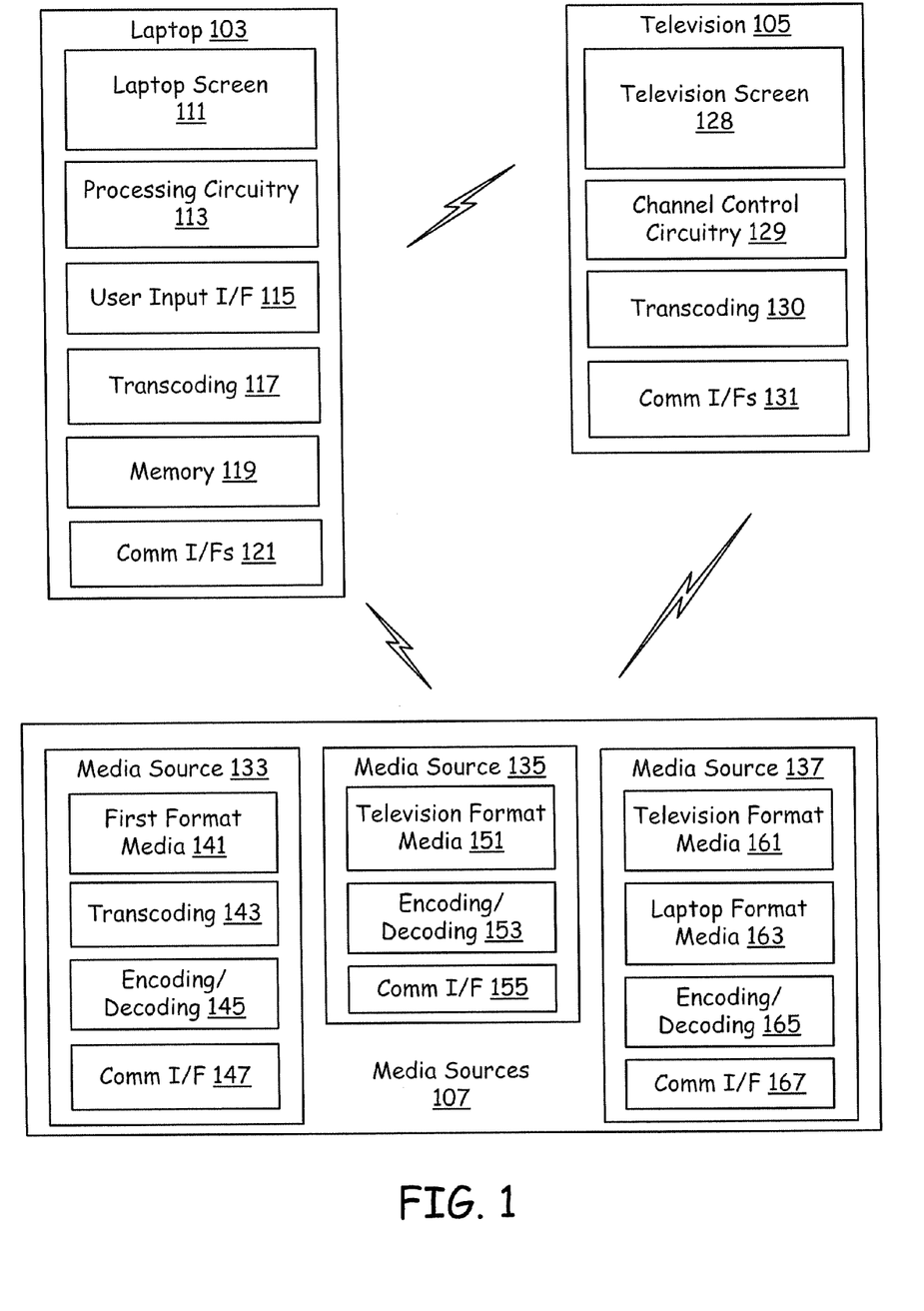
FIG. 1 is a schematic block diagram illustrating interaction between a laptop that remotely controls display on a screen of a television, the television and various media sources that deliver media to the television, in accordance with various aspects of the present invention.

FIG. 1 is a schematic block diagram illustrating interaction between a laptop 103 that remotely controls display on a screen of a television 105, the television 105 and various media sources 107 that deliver media to the television 105. The laptop 103 has a laptop screen 111 (e.g., a video display), processing circuitry 113 (e.g., which may comprise various hardware and/or software modules), a user input interface 115 and communication interfaces 121. The television 105 has a television screen 128 associated with it.

The communication interfaces 121 of the laptop 103 may comprise one interface or two interfaces, one each for communication with the television 105 and any one of the various media sources 107. For example and without limitation, the communication interfaces 121 of the laptop 103 may comprise a single communication interface via which the laptop is communicatively coupled to the television 105 and any of the various media sources 107. The user input interface 115 of the laptop 103 receives a selection from a user (e.g., a user input identifying a video selection), the processing circuitry 113 retrieves via the communication interface 121 a first video stream (or, for example, any of a variety of types of video information) from the media sources 107, and the laptop screen 111 displays the first video stream. The processing circuitry 113 of the laptop 103 also delivers (e.g., transmits) a control signal via the communication interface 121 to the television 105, where the control signal is adapted to direct display of a second video stream on the television screen 128. The first video stream is identified for the laptop screen 111, and the second video stream is identified for the television screen 128 by the selection from the user. The second video stream is delivered to the television 105 from the media sources 107.

The selection by the user may, for example, identify two (or any number of) media elements, where each media element has an audio portion and a video portion. The selection may be performed using a media guide. A media guide may, for example, comprise a list that identifies a plurality of media elements available with the media sources 107. A media element may generally comprise characteristics of any of a variety of selectable units of media information (e.g., multimedia information). For example and without limitation, a media element may comprise characteristics of a movie, music video, television program, television channel, sporting or other entertainment event, news report, computer game or any of a variety of units of recorded or live multimedia information.

The communication interface 121 receives the media guide (e.g., any of a variety of types of media guide information) from the media sources 107 (or any of a variety of sources), a laptop memory 119 stores the media guide, and the laptop screen 111 displays the media guide. The user may, for example, select two media elements, one media element for the television 105 and another media element for the laptop 103 using the media guide. The selection is entered through the user input interface 115. Subsequently, the processing circuitry 113 of the laptop 103 triggers delivery of a first of the two selected media elements from the media sources 107 to the television 105 for display on the television screen 128. The processing circuitry 113 also delivers a video portion of a second of the two selected media elements to the laptop screen 111 for display.

The first media element may be processed for (e.g., specifically adapted for) the television screen 128, and the second media element may be processed for (e.g., specifically adapted for) the laptop screen 111. Such processing may, for example and without limitation, comprise transcoding, encoding and decoding, and/or various fitting functionalities. Any or all of such functionalities can be employed or disabled in the laptop 103, in the television 105 and in the media sources 107. The laptop 103 employs transcoding in block 117, the television 105 employs transcoding in block 130, and a first media source 133 employs transcoding in block 143 and encoding/decoding in block 145.

The laptop 103 may, for example, control various television system settings (e.g., settings related to media displayed on the television screen 128). If the user input interface 115 receives a setting perusal selection (e.g., a user input indicating that the user desires to view television system settings) from the user, the communication interface 121 receives a setting of the media displayed on the television screen 128, and the laptop screen 111 displays the setting. The user may select another setting for the media displayed on the television screen 128 and enter the selection via the user input interface 115 of the laptop 103. The processing circuitry 113 of the laptop 103 then delivers a control signal via the communication interface 121 that directs application of the user-selected setting to the media displayed on the television screen 128.

The laptop 103 is communicatively coupled to the television 105 and the media sources 107 over respective wireless links. The media sources 107 and the television 105 are communicatively coupled to each other via another wireless link. The wireless links may comprise characteristics of any of a variety of communication link types (e.g., Bluetooth, IEEE 802.11, IEEE 802.15, cellular telephony (e.g., GSM/GPRS/EDGE, CDMA, CDMA2000, UMTS, WCDMA, etc.), Ultra-WideBand, standard/proprietary, etc.).

The first media source 133 of the media sources 107 supports media in a first format 141. The first media source 133 employs transcoding in block 143. Transcoding may, for example, be performed on a media in the first format to save bandwidth. A second media source 135 of the media sources 107 supports media in television format 151 (i.e., a format that is prescribed for the television screen 128, for example, HDTV (High Definition Television) format). A third media source 137 of the media sources 107 supports media in television format 161 and media in laptop format 163 (e.g., SVGA (Super Video Graphics Array) format). The media sources 133, 135, 137 employ encoding/decoding functionality in blocks 145, 153 and 165, respectively. The encoding/decoding functionality may, for example, be advantageous, when the media source handles differently encoded media.

Figure 2:
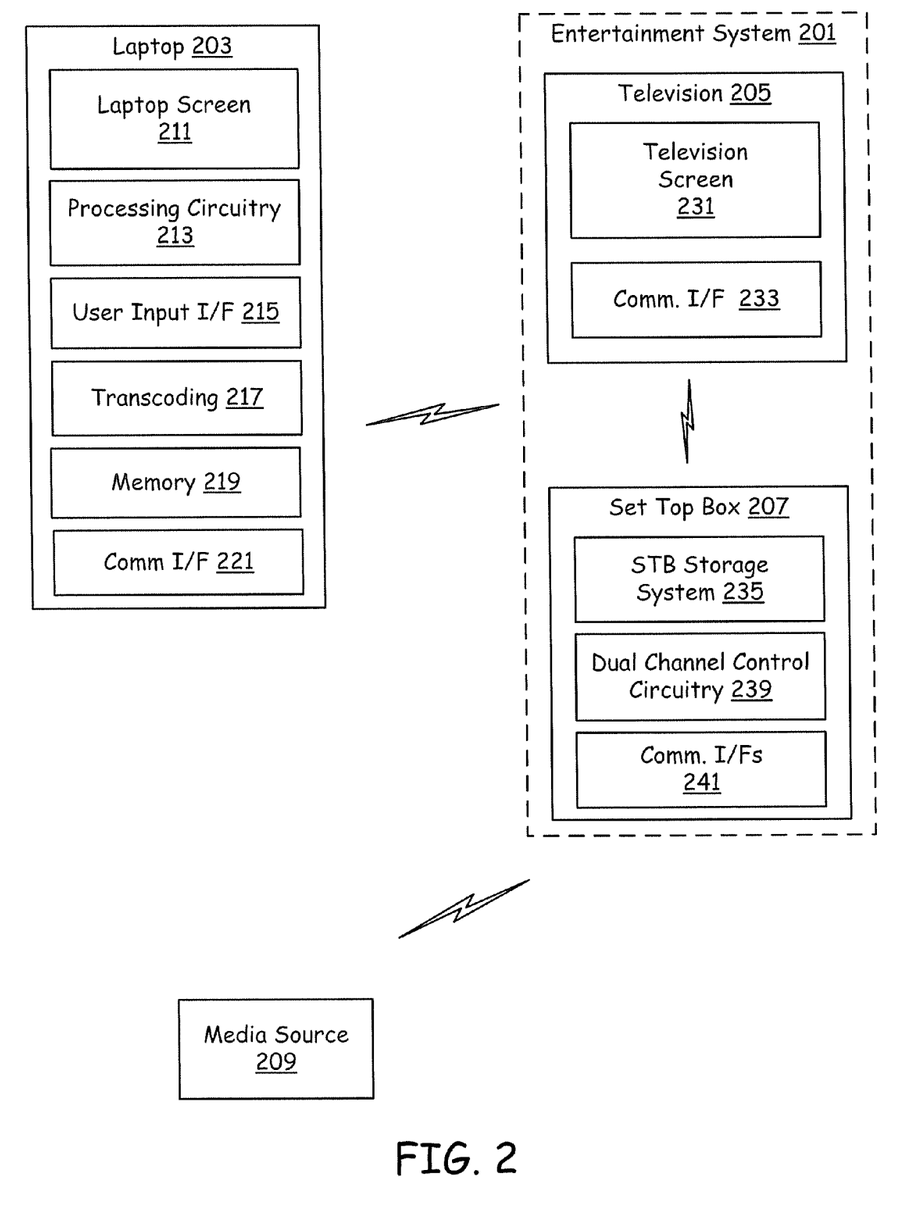
FIG. 2 is a schematic block diagram illustrating an embodiment of the laptop of FIG. 1 where the laptop interacts with the television via a set top box that is housed with the television in an entertainment system.

FIG. 2 is a schematic block diagram illustrating an embodiment of the laptop 103 of FIG. 1, where the laptop 203 interacts with the television 205 via a set top box 207 that is housed with the television 205 in an entertainment system 201 (or, e.g., any of a variety of television system configurations). The user input interface 215 of the laptop 203 receives a selection from the user. The selection may, for example, identify (e.g., directly or indirectly) a first video stream (or, e.g., any of a variety of types of video information) for the laptop 203 and a second video stream for a television screen 231. The processing circuitry 213 of the laptop 203 requests, via the communication interface 221, the first video stream from the set top box 207. The set top box 207 retrieves the first video stream from a media source 209 and sends the retrieved first video stream to the processing circuitry 213 of the laptop 203. The laptop screen 211 displays the retrieved first video stream. The processing circuitry 213 of the laptop 203 delivers a control signal via the communication interface 221 to the set top box 207. The control signal directs display of the second video stream on the television screen 231. The set top box 207 subsequently receives the second video stream from the media source 209 and delivers the received second video stream to the television screen 231 for display.

The set top box 207 is communicatively coupled to the television 205, the laptop 203 and the media source 209 via communication interfaces 241. The communication interfaces 241 may, for example, comprise a first communication interface, a second communication interface and a third communication interface. The set top box 207 interacts with the television 205, the laptop 203 and the media source 209 via the first communication interface, the second communication interface and the third communication interface, respectively. The communication link between the set top box 207 and the television 205 is shown to be a wireless link. The communication link (e.g., and any communication link discussed herein) may alternatively, for example, comprise characteristics of a wired link, tethered optical link, non-tethered optical link, etc. Communication links between the set top box 207 and the television 205 and the laptop 203 are, in this embodiment, wireless links. Wireless links may comprise characteristics of any of a variety of wireless link types (e.g., Bluetooth, IEEE 802.11, IEEE 802.15, UltraWideBand, any of a variety of cellular link types, any of a variety of infrared or other optical link types, standard or propriety link types, etc.).

The selection from the user may, for example, identify two media elements where each media element has an audio portion and a video portion. The selection may be performed using a media guide. A media guide may, for example, comprise a list that identifies a plurality of media elements available with the media source 209. The two selected media elements may then, for example, correspond to any two of the plurality of media elements.

The communication interface 221 of the laptop 203 receives a media guide (e.g., media guide information) from the media source 209 via the set top box 207. Laptop memory 219 stores the media guide, and the laptop screen 211 displays the media guide. The user interacts with the laptop screen 211 visually, scans the media guide and enters a selection through the user input interface 215 of the laptop 203. The selection from the user identifies (e.g., directly or indirectly), for example, two media elements, one for the television 205 and another for the laptop 203.

The set top box 207 comprises a storage system 235. The set top box 207, in response to a request from the laptop 203 for the media guide, retrieves the media guide and forwards the retrieved media guide to the laptop 203. The media guide, for example, may reside in the media source 209. In one embodiment, the set top box 207, after retrieving the media guide from the media source 209, stores the media guide in the storage system 235 and sends a second copy of the media guide to the laptop 203. In this embodiment, the set top box 207, in response to a consecutive request from the laptop 203 for the media guide, might not retrieve the media guide again from the media source 209. In such a case, the set top box 207, may for example, retrieve the media guide from the storage system 235 and forward the media guide to the laptop 203. In this embodiment, a saving is made in time and bandwidth.

The processing circuitry 213 of the laptop 203 triggers delivery of a first of the two selected media elements from the media source 209 to the set top box 207. The set top box 207 receives the first of the two selected media elements from the media source 209 and forwards the received media element to display driver circuitry of the television 205 for display on the television screen 231. The processing circuitry 213 of the laptop 203 also sends a request to the set top box 207 for the second of the two selected media elements. The set top box 207 receives the second of the two selected media elements from the media source 209 and forwards the received media element to the laptop 203. The laptop 203 receives the second of the two selected media elements from the set top box 207 via a second communication interface of the set top box 207 and the communication interface 221 of the laptop 203. The laptop screen 211 then displays a video portion of the second of the two selected media elements.

Figure 3:
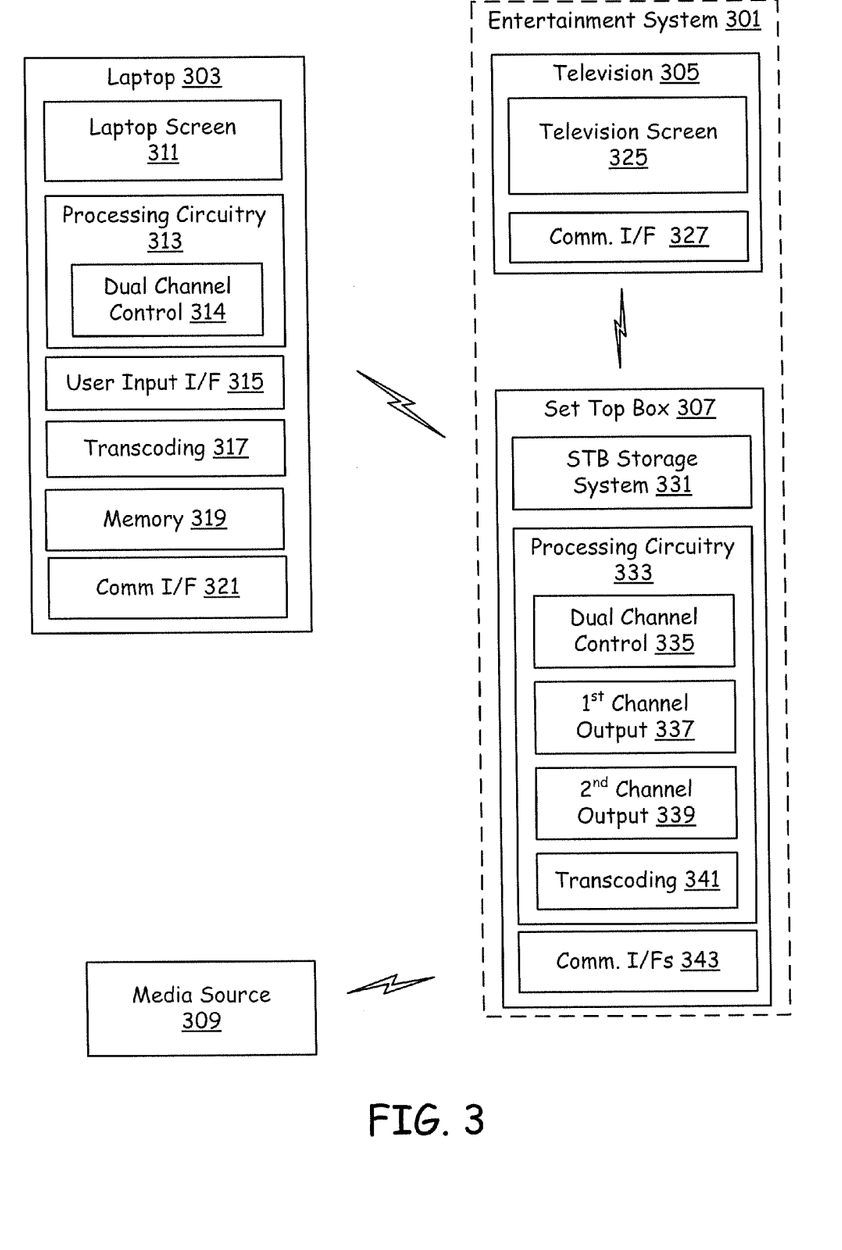
FIG. 3 is a schematic block diagram illustrating an embodiment of the laptop of FIG. 2 further providing dual channel control support in the laptop and in the set top box.

FIG. 3 is a schematic block diagram illustrating an embodiment of the laptop 203 of FIG. 2 further providing dual channel control support in the laptop 303 and in the set top box 307. The laptop 303 controls display of a first television channel on the entertainment system 301 and display of a second television channel on the laptop 303. Each of the first television channel and the second television channel has an audio portion and a video portion. The processing circuitry 313 of the laptop 303 sends a control signal to the set top box 307 directing delivery of the first television channel from the media source 309 to a television 305. In this non-limiting example, the media source 309 is a television channel broadcaster and/or a television channel service provider. After receiving the control signal, the set top box 307 receives the first television channel from the media source 309 (e.g., television channel broadcaster and/or a television channel service provider) and forwards the first television channel to the television 305. The television 305 displays a video portion of the first television channel on a television screen 325. The television 305 plays an audio portion of the first television channel on a television speaker.

The set top box 307 receives the second television channel from the media source 309 (e.g., television channel broadcaster and/or a television channel service provider) and forwards the second television channel to the laptop 303. The laptop 303 receives the second television channel via the communication interface 321, and next the processing circuitry 313 of the laptop 303 forwards a video portion of the received second television channel to the laptop screen 311 for display. The processing circuitry 313 of the laptop 303 supports dual channel control functionality 314 by supporting the laptop screen 311 and by supporting the television screen 325 via the set top box 307. Similarly, the set top box 307 supports the laptop screen 311 and the television screen 325, and hence the processing circuitry 333 of the set top box 307 also supports dual channel control functionality as shown in block 335. A first channel output 337 and a second channel output 339 are shown in the processing circuitry 333 of the set top box 307. A first of the channel outputs 337, 339 is forwarded by the processing circuitry 333 of the set top box 307 to the television screen 325, and a second of the channel outputs 337, 339 is sent by the processing circuitry 333 of the set top box 307 to the laptop 303.

The laptop 303 may direct a third television channel to a STB storage system 331 of the set top box 307 in response to a media storage command from the user through the user input interface 315 of the laptop 303. The media storage command from the user identifies the third television channel. The laptop 303 sends a second control signal to the set top box 307, which subsequently receives the third television channel from the media source 309 and stores information corresponding to the received third television channel in the STB storage system 331.

The third television channel may be processed in the set top box 307 for the STB storage system 331. Such processing may, for example, comprise one or more of transcoding, encoding and decoding. Transcoding may, for example, be performed to save bandwidth occupied by an audio portion and/or a video portion of the third television channel. Encoding and decoding may, for example, be performed to make the audio portion and the video portion of the third television channel compatible with an encoding standard used in the laptop 303, in the television 305 and/or in the set top box 307.

The laptop 303 may send a third control signal to the set top box 307 in response to a television setting perusal request input by the user via the user input interface 315 of the laptop 303. The third control signal triggers the set top box 307 to receive setting information corresponding to a television channel (or any media element) displayed on the television screen 325 from the television 305 and send the setting information to the laptop 303. The laptop 303 receives the setting information via the communication interface 321, and the laptop screen 311 displays the setting information. The user may select another setting for the television channel displayed on the television screen 325 and enter a selection corresponding to the another setting via the user input interface 315 of the laptop 303. The processing circuitry 313 of the laptop 303 then delivers a fourth control signal via the communication interface 321 that directs application of the user-selected setting to the television channel displayed on the television screen 325.

Figure 4:
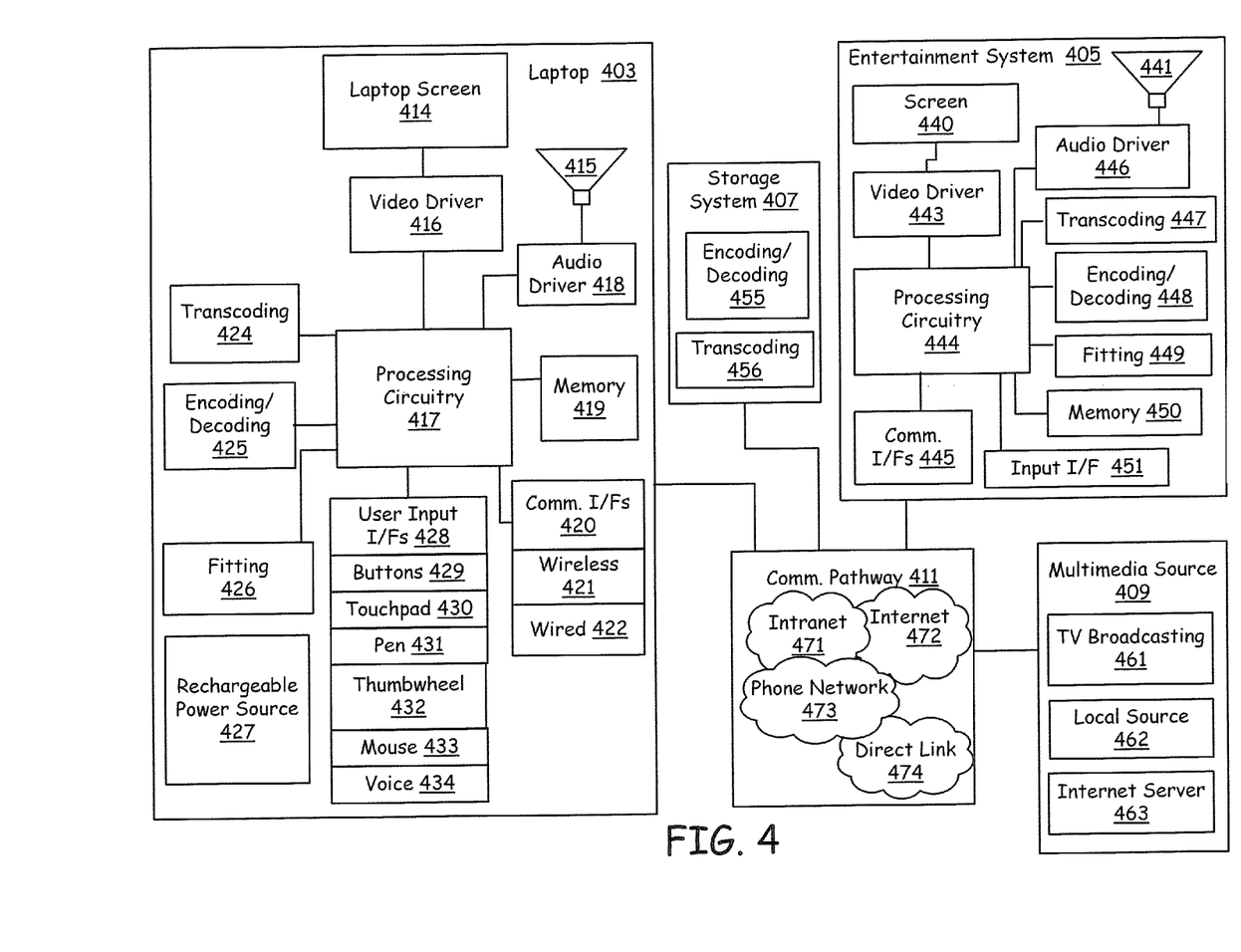
FIG. 4 is a schematic block diagram illustrating interaction between a laptop, an entertainment system, a multimedia source and a storage system and communication paths between these elements, in accordance with various aspects of the present invention.

FIG. 4 is a schematic block diagram illustrating interaction between a laptop 403, an entertainment system 405, a multimedia source 409 and a storage system 407 and communication paths 411 between these elements. The laptop 403 has a laptop screen 414, a speaker 415, a laptop memory 419, a communication interface 420 and a user input interface 428 that are communicatively coupled to each other via processing circuitry 417 of the laptop 403. The laptop 403 also comprises a transcoding unit 424, an encoding/decoding unit 425 and a fitting unit 426. The transcoding unit 424, the encoding/decoding unit 425 and the fitting unit 426 may be disabled. The laptop 403 further comprises a rechargeable power source 427 supplying power that may be needed, for example, for processing multimedia information and for communicating with the entertainment system 405 or other communicatively coupled entities.

The communication interface 420 of the laptop 403 may, for example, be either of, or a combination of, a wireless interface 421 and a wired interface 422. The user input interface 428 may, for example, comprise one or more of: buttons 429, a touchpad 430, a pen 431, a thumbwheel 432, a mouse 433 and a voice interface 434.

The entertainment system 405 has a screen 440, a speaker 441, a memory 450, a communication interface 445 and an input interface 451 that are communicatively coupled to each other via processing circuitry 444 of the entertainment system 405. The communication interface 445 may, for example, be either of, or a combination of, a wireless interface and a wired interface. The entertainment system 405 may comprise a television and a set top box. In such case, some of the elements of the entertainment system 405 may be housed in the television and the rest of the elements may be housed in the set top box. The entertainment system 405 may be, for example, a television and a home theatre system.

The multimedia source 409 comprises television broadcasting 461, a local media source 462 and an Internet server 463. The multimedia source 409 is a repository of a plurality of multimedia elements and a plurality of video streams. Each of the plurality of multimedia elements has an audio portion and a video portion. The plurality of multimedia elements may, for example, include one of, or a combination of, a television channel, a computer game, a movie and recorded multimedia. The plurality of video streams may, for example, include one or more of a recorded video, a picture, a photo, a video portion of a television channel, a video game and a live snippet.

A user uses the laptop 403 to control selection and display of a multimedia element on the screen 440 of the entertainment system 405. The laptop 403 receives a selection from the user via the user input interface 428. The selection may, for example, be a selection of two multimedia elements, two video streams, a multimedia element and a video stream for the laptop 403 and the entertainment system 405, respectively, a multimedia element for either the laptop 403 or the entertainment system 405, a setting selection for the entertainment system 405, a media storage selection identifying a second multimedia element for the storage system 407, and a media swapping selection.

For example, the selection from the user identifies two multimedia elements, a first multimedia element for the laptop 403 and a second multimedia element for the entertainment system 405. The laptop 403 receives, via the communication interface 420, the first multimedia element from the multimedia source 409. The audio portion of the first multimedia element is forwarded to the speaker 415 for listening, and the video portion is forwarded to the laptop screen 414 for display. The laptop 403 sends a control signal to the entertainment system 405 to trigger delivery of the second multimedia element from the multimedia source 409 to the entertainment system 405. The entertainment system 405 receives, via the communication interface 445, the second multimedia element from the multimedia source 409. The audio portion of the second multimedia element is forwarded to the speaker 441 for listening, and the video portion is forwarded to the screen 440 for display.

The first multimedia element is processed in the laptop 403. Such processing may, for example, comprise transcoding 424, encoding and decoding 425, and fitting functionalities 426. One or more of these functionalities may be disabled depending on processing capability of the processing circuitry 417, consumption of the rechargeable power source 427 and support of similar functionalities in the entertainment system 405, the multimedia source 409 and the storage system 407. The second multimedia element is processed in the entertainment system 405. Such processing may, for example, comprise transcoding 447, encoding and decoding 448, and fitting functionalities 449. One or more of these functionalities may be disabled.

Either or both of the laptop 403 and the entertainment system 405 might receive only the video or audio portion of a multimedia element. Either or both of the laptop 403 and the entertainment system 405 can alternately, or in addition, receive a video stream, depending on the selection.

For example and without limitation, the selection may correspond to perusal of settings of the entertainment system 405. The laptop 403, for example, receives speaker and screen settings of the entertainment system 405 from the entertainment system 405 via the communication interface 420 and displays the settings on the laptop screen 414. If the selection corresponds to application of a different setting for either the screen 440 or the speaker 441 or both of the entertainment system 405, the processing circuitry 417 of the laptop 403 then delivers a control signal via the communication interface 420 that directs application of the different setting to the entertainment system 405.

For example, the selection may correspond to a media-swapping request. The laptop 403 sends a request to the multimedia source 409 for a first multimedia element that is currently being played by the entertainment system (e.g., displayed on the entertainment system screen 440). The laptop 403 sends a control signal to the multimedia source 409 directing the multimedia source 409 to deliver a second multimedia element that is currently being played by the laptop 403 to the entertainment system 405. The multimedia source 409 delivers the second multimedia element to the entertainment system 405. The entertainment system 405 then plays the second multimedia element. The laptop 403 receives the first multimedia element from the multimedia source 409 via the communication interface 420. The laptop 403 then plays the first multimedia element.

In yet another case, the selection identifies a storage system 407 and a multimedia element. The laptop 403 triggers delivery of the multimedia element from the multimedia source 409 to the storage system 407. The communication pathway 411 connecting the laptop 403, the entertainment system 405, the storage system 405 and the multimedia source 409 may, for example, comprise one of, or a combination of, a copper wire, a fiber and a wireless medium. Wireless technologies used for communication may, for example and without limitation, be one or more of a cellular transmission, 802.11, 802.15, UltrawideBand, UMTS, GSM, GPRS, Bluetooth, and an infrared transmission. The storage system 407 may, for example, comprise one or more of a portable storage, a non-portable storage, a removable storage, a rewritable storage, a read only storage, a worm storage, a volatile storage and a nonvolatile storage.

The laptop 403, the entertainment system 405, the storage system 407 and the multimedia source 409 may, for example, be located in four different premises. The storage system 407 may alternatively, for example, be an integral part of the laptop 403, or the entertainment system 405 or the multimedia source 409. The laptop 403 can also trigger delivery of the multimedia element from the multimedia source 409 to more than one storage system.

Figure 5:
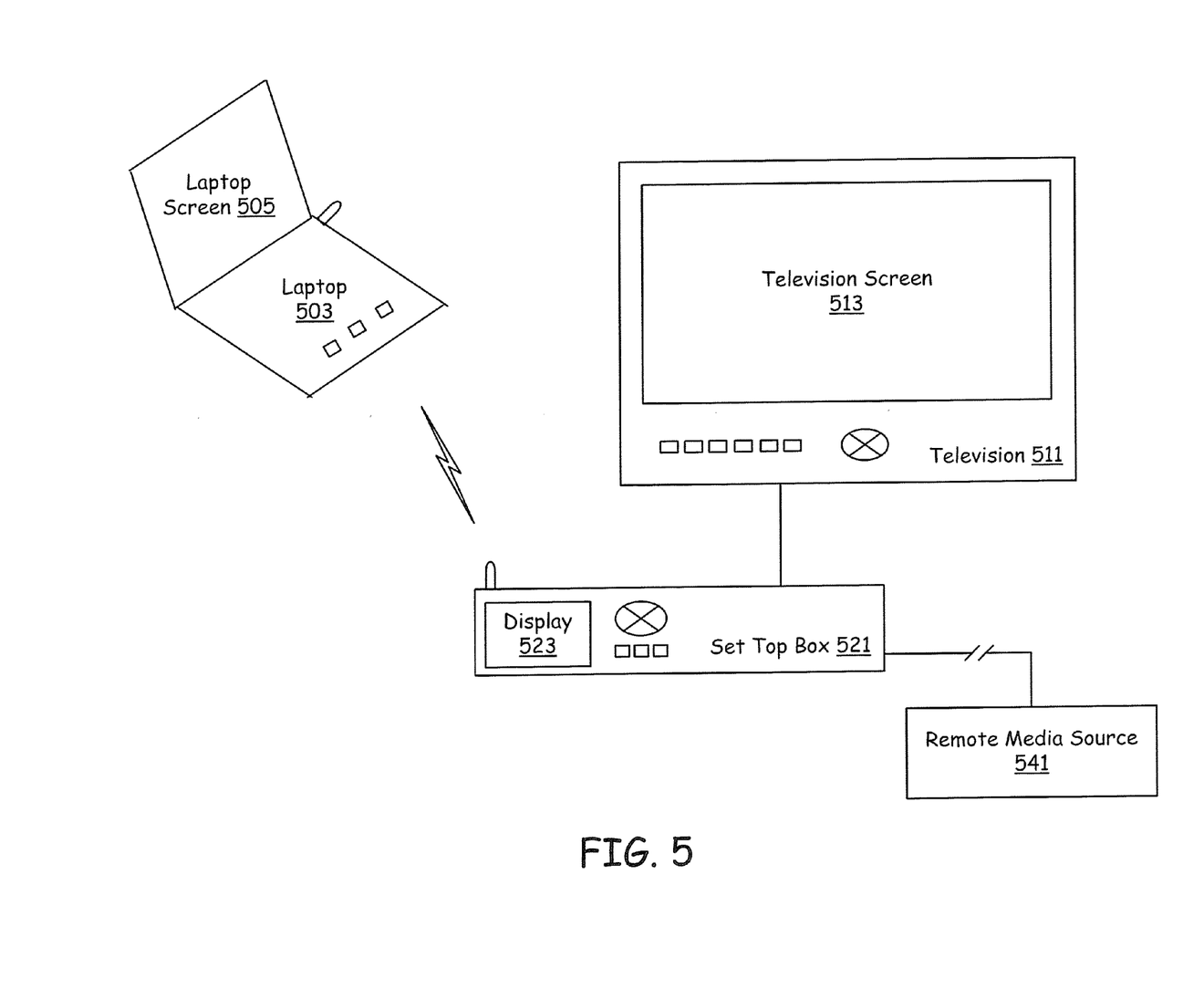
FIG. 5 is a schematic block diagram illustrating a laptop that indirectly controls display of media sourced by a remote media source on a television screen in addition to managing computations and processing information as per a set of instructions input by a user.

FIG. 5 is a schematic block diagram illustrating a laptop 503 that indirectly controls display of media sourced by a remote media source 541 on a television screen 513, in addition to managing computations and processing information as per a set of instructions input by a user. The laptop 503 controls delivery of media from the remote media source 541 to the television 511 via a set top box 521. The set top box 521 is communicatively coupled to the television 511 over a wired link. The wired link may be, for example, an optical fiber or a copper cable. The set top box 521 may alternately or in addition be communicatively coupled to the television 511 via, for example, any one or combination of an infrared, a cellular network and a Bluetooth connection. The set top box 521 interacts with the remote media source 541 over a second wired link. The second wired link may be one or more of a copper cable and an optical fiber. The set top box 521 is communicatively coupled (or connected) to the laptop 503 through a wireless network. The wireless network may comprise characteristics of any of a variety of wireless link types (e.g., Bluetooth, IEEE 802.11, IEEE 802.15, UltraWideBand, satellite link, any of a variety of cellular link types, any of a variety of infrared or other optical link types, standard or propriety link types, etc.). In the one embodiment shown in the FIG. 5, the set top box 521 comprises a wireless communication interface and two wired communication interfaces, first of the two for the television 511 and second of the two for the remote media source 541. The laptop 503 is located at a first premises, the set top box 521 and the television 511 are located at a second premises, and the remote media source 541 is located at a third premises. In another embodiment, the laptop 503, the television 511 and the set top box 521 may be located at the first premises. The remote media source 541 may be, for example and without limitation, a television broadcaster, a music repository, a DVD, a VCD, a video camera, a photo camera, a computer game and a movie server.

The laptop 503 receives a request from a user through keys (or other input devices) of the laptop 503 and accordingly sends a control signal to the set top box 521. The control signal from the laptop 503 to the set top box 521 may, for example, identify a media element and may in addition indicate if the media element is meant for the television 511 or the laptop 503. If the media element is meant for the laptop 503, then the set top box 521 receives the media element from the remote media source 541 and forwards the received media element to the laptop 503. The laptop 503 then displays the media element on the laptop screen 505. If the media element is meant for the television 511, then the set top box 521 receives the media element from the remote media source 541 and forwards the received media element to the television 511. The media element is subsequently displayed on the television screen 513. For example, the remote media source 541 is a movie server and the media element is a movie. The request received via the keys of the laptop 503 indicates that the movie is to be displayed on the laptop screen 505. In this non-limiting example, in response to the request, the laptop 503 instructs the set top box 521 to receive the movie from the movie server (541) via the second wired link and to forward the received movie to the laptop 503. The laptop 503 receives the movie from the set top box 521 via the wireless network and next displays a video portion of the movie on the laptop screen 505 and plays an audio portion of the movie on a laptop speaker.

Figure 6:
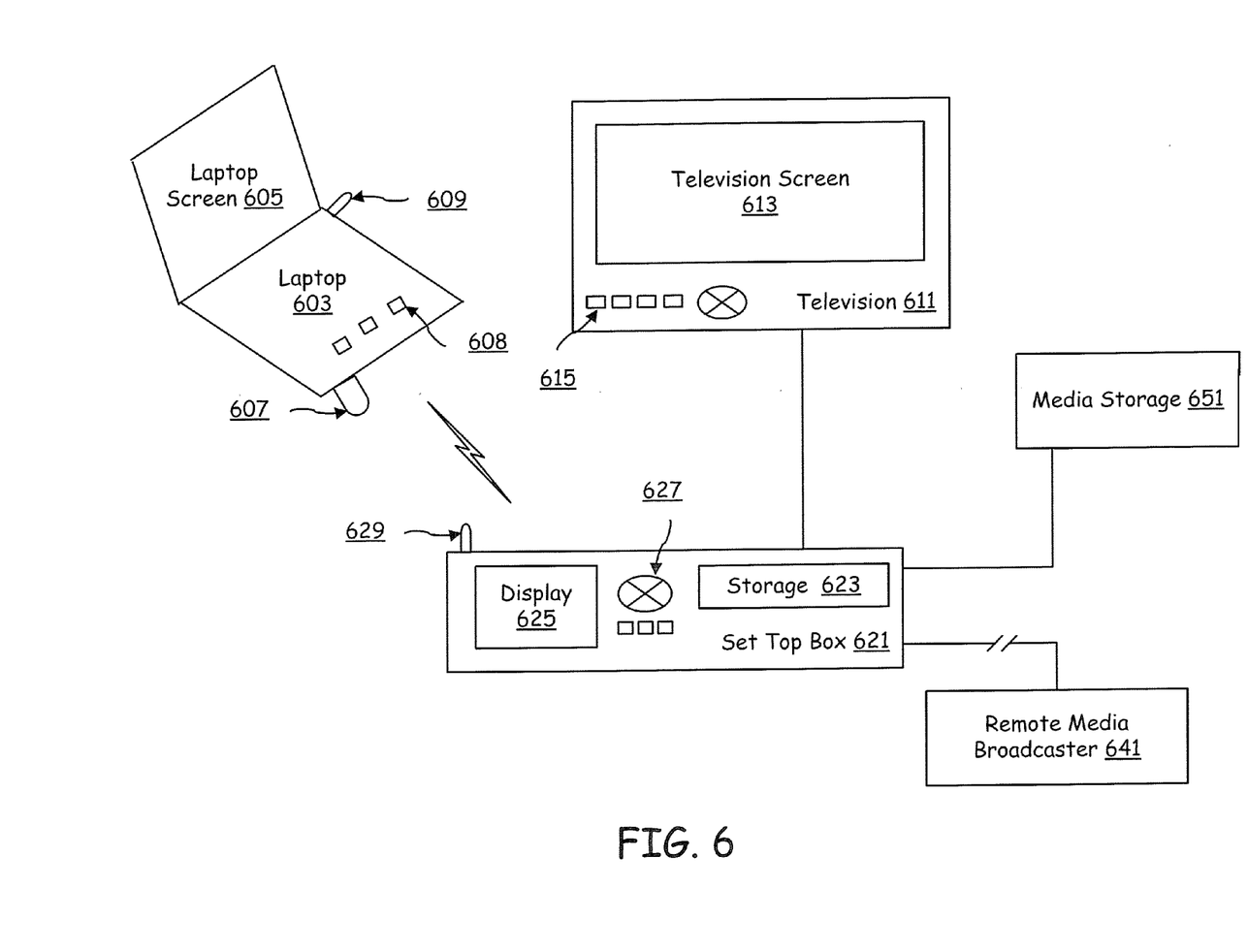
FIG. 6 is a schematic block diagram illustrating an embodiment of the laptop of FIG. 5 further controlling storage of media sourced by a remote media broadcaster to a storage system.

FIG. 6 is a schematic block diagram illustrating an embodiment of the laptop 503 of FIG. 5 further controlling storage of media sourced by a remote media broadcaster 641 to a storage system. A television 611 comprises a plurality of buttons 615 via which a user may control settings and display on the television screen 613. The television 611 is communicatively coupled to a set top box 621. The set top box 621 comprises a second plurality of buttons 627 and a display 629. The user may use the second plurality of buttons 627 and the display 629 to modify the settings and display on the television screen 613. The laptop 603 comprises a third plurality of buttons 608 with which the user may control the settings and display on the television screen 613. The laptop 603 controls delivery of media (e.g., multimedia information and/or video information) from the remote media broadcaster 641 to the television 611 via the set top box 621. The laptop 603 is communicatively coupled to the set top box 621 that is again communicatively coupled to the remote media broadcaster 641. The remote media broadcaster 641 is shown in the figure to be coupled, to the set top box 621 via a wired link. In one embodiment, the communication connection between the set top box 621 and the remote media broadcaster 641 may be a wireless link, which may typically be, without limitation, a satellite link, any of a variety of cellular links or a Bluetooth link. The set top box 621 is located at a first premises, and the remote media broadcaster 641 is located at a second premises. The remote media broadcaster 641 is typically a television channel broadcaster, a radio channel broadcaster or a television channel service provider premises. Media broadcast by the remote media broadcaster 641 may, for example, comprise a plurality of television programs and/or a plurality of radio programs. The set top box 621 has four communication interfaces, first of the four to communicate with the television 611, second of the four to communicate with the remote media broadcaster 641, third of the four to interact with a media storage 651 and fourth of the four 629 to communicate with the laptop 603.

The storage system may be one of the media storage 651 that is communicatively coupled to the set top box 621, a storage 623 housed with the set top box 621 and a removable media storage unit 607 that is plugged into the laptop 603. The laptop 603 may receive a media storage request from a user via the third plurality of buttons 608. The media storage request identifies the storage system and a media element that is available with the remote media broadcaster 641.

If the media storage request received by the laptop 603 identifies the media storage 651 that is communicatively coupled to the set top box 621, then the laptop 603 sends a control signal to the set top box 621 using communication interface 609 of the laptop. In response to the control signal from the laptop 603, the set top box 621 receives the media element from the remote media broadcaster 641 and delivers the received media element to the media storage 651 for storage. The media storage 651 may, for example, be one or combination of a media server, a DVD, a VCD, a tape and a music repository. The media storage 651 may be a removable storage unit. In that case, the media storage 651 may be plugged into any device (e.g., the laptop 603) having a media player, and the stored media element may be replayed on the device using the media player. For example and without limitation, the media element may be a sports program, and the media storage 651 may be a DVD. In this non-limiting example, the sports program once stored in the DVD may be replayed at a subsequent time using the media player.

If the media storage request identifies the storage 623 housed with the set top box 621, then the laptop 603 sends a control signal to the set top box 621 that triggers delivery of the media element from the remote media broadcaster 641 to the set top box 621. The set top box 621 receives the media element from the remote media broadcaster 641 and forwards the received media element to the storage 623 for storage. If the media storage request identifies the removable media storage unit 607 that is plugged into the laptop, then the laptop 603 receives the media element from the remote media broadcaster 641 via the set top box 621 and forwards the received media element to the removable media storage unit 607 for storage.

The media storage request received by the laptop 603 may identify more than one media storage system, in which case, the media element is delivered to all the selected media storage systems. The media element stored in the storage systems (607, 623 or 651 or a combination thereof) may be replayed at a subsequent time on the device having the media player.

Figure 7:
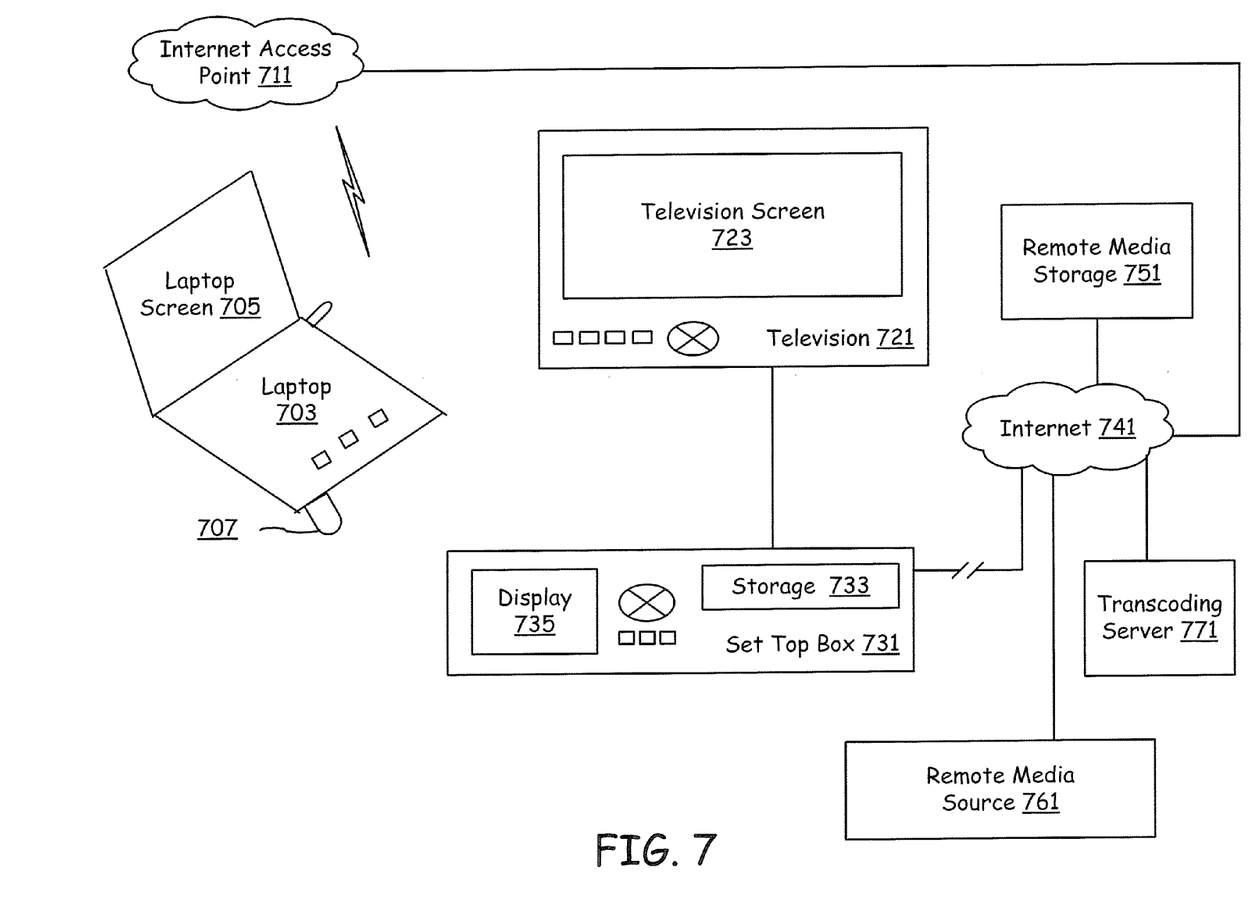
FIG. 7 is a schematic block diagram illustrating an embodiment of the laptop of FIG. 6 wherein the laptop interacts with the television screen, the remote media broadcaster and the storage system via the Internet.

FIG. 7 is a schematic block diagram illustrating an embodiment of the laptop 603 of FIG. 6 wherein the laptop 703 interacts with the television screen 723, a remote media source 761 and the media storage 751 via the Internet 741. The laptop 703 comprises an IP (Internet Protocol) address. The laptop 703 is adapted to communicate to any device having another IP address. The laptop 703 is communicatively coupled to an Internet access point 711 via a wireless link. The wireless link may, for example, be one or more of a Bluetooth link, an IEEE 802.11 link and an IEEE 802.15 link. The laptop 703 may be coupled to the Internet access point 711 via a wired link. The wired link may, for example, be one or a combination of an optical fiber link, a coaxial cable link and an Ethernet link. The laptop 703 interacts with the Internet 741 via the Internet access point 711. The media storage 751 and the remote media source 761 are communicatively coupled to the Internet 741. The laptop 703 interacts with the media storage 751 and the remote media source 761 via the Internet 741 if necessary. The remote media source 761 comprises a plurality of media elements. The plurality of media elements may be, for example, a combination of stored movies, personal videos, television programs, video portions of television programs and video games. The laptop 703 may access the plurality of media elements using the Internet 741.

The set top box 731 comprises a set top box storage 733. The set top box 731 is coupled to the Internet 741 and coupled to the media storage 751 and the remote media source 761 via the Internet 741. The set top box 731 may access the plurality of media elements using the Internet 741. The set top box 731 comprises a second IP address. The set top box 731 is communicatively coupled to a television 721 and controls settings and display of the television screen 723. The laptop 703 interacts with the set top box 731 via the Internet 741.

The laptop 703 comprises a plurality of buttons (or other input devices) via which a user enters a selection. The laptop 703 receives a media selection. The media selection identifies a first media element and one or more displays on which the first media element is to be displayed. For example, the remote media source 761 is a television program broadcaster, and the first media element is a television program broadcast by the television program broadcaster 761. The media selection identifies the laptop screen 705 and the television screen 723 as the displays on which the first media element is to be displayed. The laptop 703 instructs the set top box 731 to receive the television program from the television program broadcaster 761 via the Internet 741 and forward the television program to the television 721. The television 721 receives the television program from the set top box 731 and displays a video portion of the television program on the television screen 723. The set top box 731, in addition, sends the television program to the laptop 703 via the Internet 741. Alternately, the laptop 703 retrieves the television program from the television program broadcaster 761 via the Internet 741 and the Internet access point 711. The laptop 703 displays the received television program on the laptop screen 705.

The laptop 703 may subsequently receive a storage selection entered using the plurality of buttons. The storage selection identifies a second media element and a location where the second media element is to be stored. For example and without limitation, the remote media source 761 is a movie server, the second media element is a movie stored in the movie server 761 and the location where the movie (the second media element) is to be stored is a removable storage unit 707 attached to the laptop 703. For this example, the laptop 703 retrieves the movie (the second media element)

from the movie server 761 via the Internet 741 and the Internet access point 711 and next stores the movie in the removable storage unit 707.

The laptop screen 705 and the television screen 723 may support media in separate formats. For example, the laptop 703 receives a second media selection. The second media selection identifies a music video that is to be displayed on the laptop screen 705. The laptop 703 determines that the music video is in a format not supported by the laptop screen 705. The laptop 703 directs flow of the music video from the remote media source 761 to a transcoding server 771 via the Internet 741. The transcoding server 771 applies transcoding to the music video and generates the music video in the laptop screen format. The laptop 703 receives the music video in the laptop screen format from the transcoding server 771 via the Internet 741 and the Internet access point 711. Next, the laptop screen 705 displays the transcoded music video.

Figure 8:
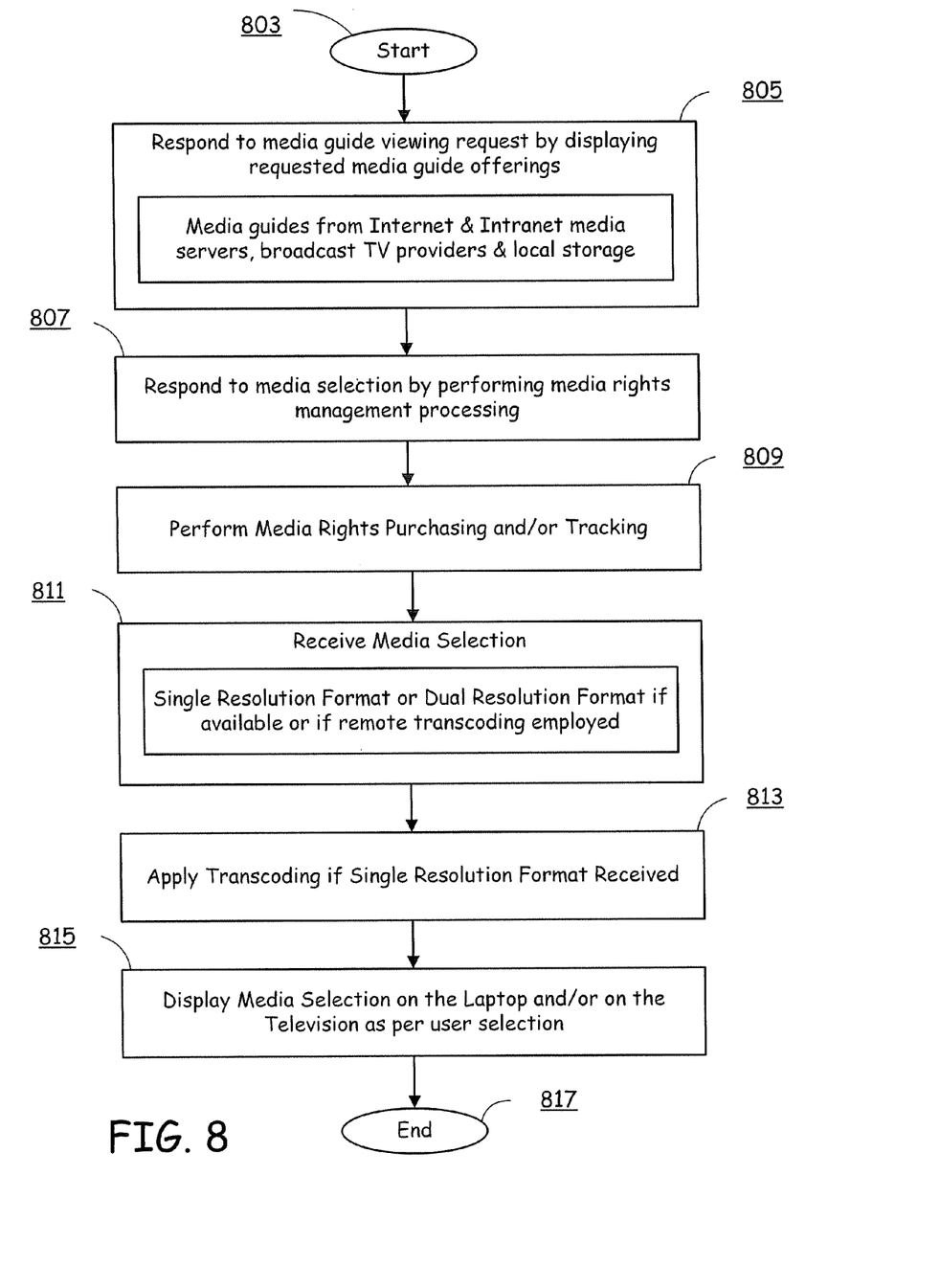
FIG. 8 is a flowchart illustrating a method of controlling selection and delivery of processed media to a television screen and to a screen of a laptop based television remote control for display by the laptop, in accordance with various aspects of the present invention.

FIG. 8 is a flowchart illustrating a method of controlling selection and delivery of processed media to a television screen and to a screen of a laptop-based remote control for display by the laptop. The method may begin at a start block (or step) 803. In a next block 805, the laptop-based remote control responds to a media guide-viewing request from a user. The user may enter the media guide-viewing request through an input interface of the laptop. In such case, the laptop receives the media guide-viewing request via the input interface of the laptop at block 805 and responds to the request by receiving the media guide from the media source and displaying the media guide on the screen of the laptop in block 805. A media source may, for example, comprise one of an Internet media server, an Intranet media server, a broadcast television provider and a local media storage such as a hard drive, a DVD, a CD and a tape. The media guide identifies a plurality of media elements available with the media source(s). The media guide helps the user to make a media selection of one or more than one media element from the plurality of media elements. A media element may, for example, comprise a movie, a television channel, an audio-visual game, a photo, a live snippet, a video, a video portion of a television channel, and a video game.

In a next block 807, the laptop receives the media selection from the user. The media selection may be based on the media guide. The media selection may identify a media element for either the laptop or the television screen or for both. The media selection may alternately identify two media elements, one for the laptop and another for the television screen. For example and without limitation, the media selection identifies a media element to be displayed on a screen of the laptop. The laptop sends a request to the media source seeking delivery of the selected media element from the media source. The selected media element may be a free-to-use media element. If the selected media element is not free, then the laptop purchases the selected media element in next block 809. Purchasing may, for example, include one of, or a combination of, key based and plastic card based purchasing. Purchasing may include one or more user interactive steps, where the user is guided through displays on the screen of the laptop followed by the laptop receiving entries from the user via the input interface of the laptop. If the selected media element is free-to-use then the laptop might not purchase the selected media element. Even then the laptop may perform credential verification functionalities at block 809.

The laptop receives the selected media element from the media source in a next block 811. The selected media element may be received in a format that may or may not be supported by the screen of the laptop. If the selected media element is received in a format that is not supported by the screen of the laptop, then transcoding is applied to the received media element by the laptop as shown in a next block 813, and transcoded media is generated. The laptop might not be able to perform the transcoding because of limited processing capability, limited power or limited memory. In that case, the laptop may direct a transcoding server to perform the transcoding functionality at block 811. The laptop may send the received media element to the transcoding server or may direct the selected media element from the media source to the transcoding server and then receive the transcoded media from the transcoding server. If the transcoding server performs the transcoding functionality, then the laptop does not apply the transcoding to the received media element in block 813. The laptop displays the transcoded media on the screen of the laptop in a next and final block 815.

The media selection may in addition identify a second media element to be displayed on the television screen. The laptop sends a request to the media source seeking delivery of the second media element from the media source to the television screen. The media source sends a second media element to the television for display.

Figure 9:
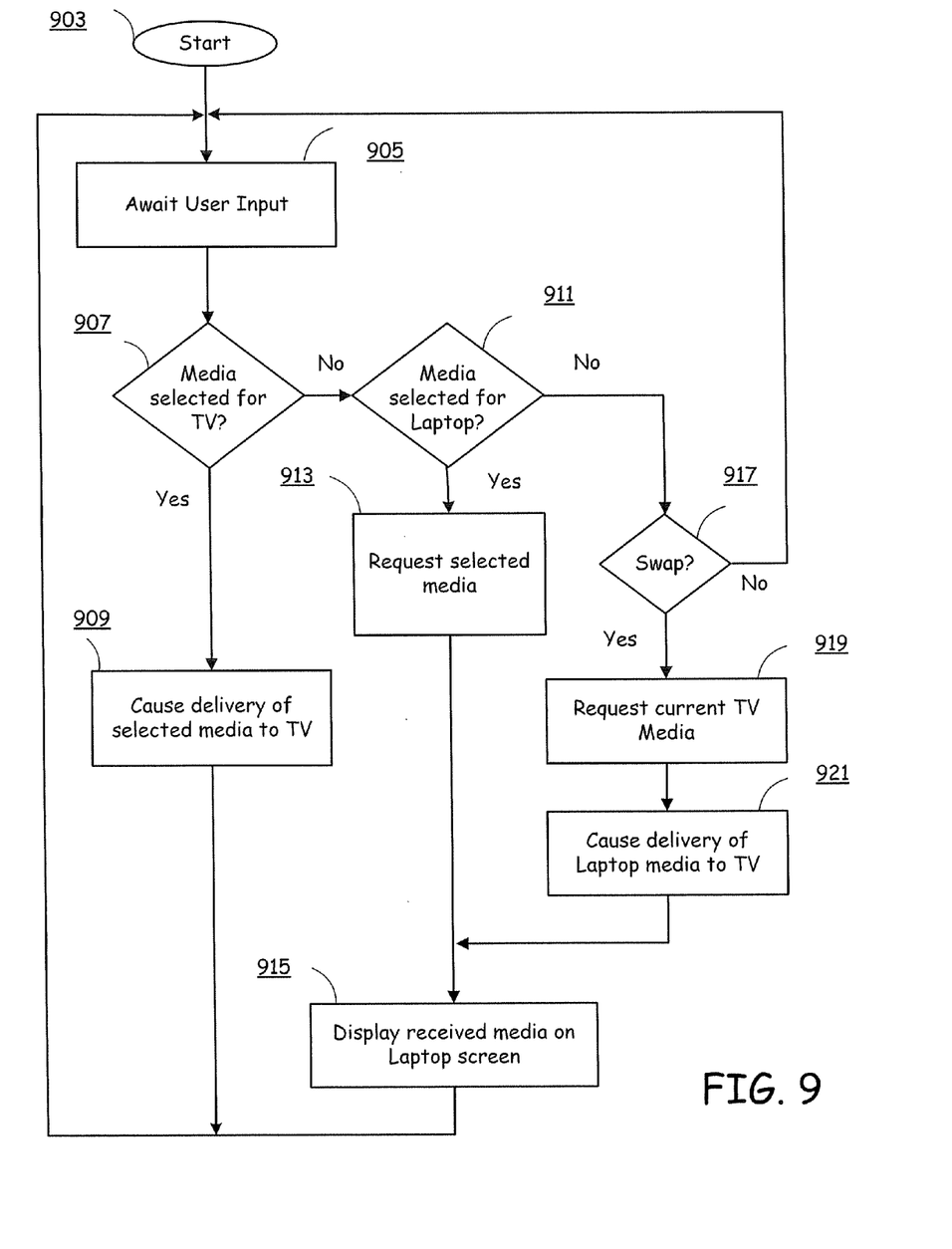
FIG. 9 is a flowchart illustrating functions of media selection and swapping of the laptop television remote control of FIG. 8, in accordance with various aspects of the present ion.

FIG. 9 is a flowchart illustrating functions of media selection and swapping of the laptop-based television remote control of FIG. 8, in accordance with various aspects of the present invention. The method may begin at block (or step) 903. The laptop waits for a user input as shown at a next block 905. The laptop receives the user input from the user in block 905. The user input may identify a media selection comprising a first media element for the television and/or a second media element for the laptop. The user input may comprise, in addition or only, a media-swapping request. In a next block 907, the laptop checks whether the first media element for the television is selected. If the first media element for the television is selected, then the laptop triggers delivery of the first media element to the television at a next block 909. Next, the operational flow of the laptop-based television remote control returns to block 905.

If the laptop determines in block 907 that the first media element is not selected, then the laptop checks in block 911 if the second media element for the laptop is selected. If the laptop determines that the second media element is selected, then the laptop, in a next block 913, requests the second media element. The laptop may request the media source for the second media element if the media source stores the second media element. The laptop receives the second media element in block 913. In a next block 915, the laptop displays the second media element on the laptop screen. Then, the operational flow of the laptop returns to block 905 and the laptop awaits another user input.

If the laptop determines in block 911 that the second media element is not selected, then the laptop checks in a next block 917 whether the user input comprises the media-swapping request. If the user input does not comprise the media-swapping request, then operational flow of the laptop returns to block 905. If yes, then the laptop requests a media element that is currently displayed on the television screen in a next block 919 and subsequently receives the media element that is currently displayed on the television screen in the same block 919. The laptop also triggers delivery of another media element that is currently displayed on the screen of the laptop to the television screen in a next block 921. The laptop then displays the received media element on the screen of the laptop in block 915. Thus, the media element that was displayed on the television screen is now displayed on the screen of the laptop and vice versa. The operational flow of the laptop then returns to block 905, and the laptop awaits another user input.

As one of average skill in the art will appreciate, the term "communicatively coupled"," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled"."

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have additionally been described above with the aid of functional building blocks illustrating the performance of certain significant functions and relationships. The boundaries of these functional building blocks and relationships between various functional building blocks have been arbitrarily defined for convenience of description. Alternate boundaries or relationships could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate boundaries or relationships definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

In summary, various aspects of the present invention provide a laptop that interacts with a television system and/or media source. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

We claim:

1. A portable computer that interacts with a home television system, the home television system having a first screen, the portable computer comprising:
a communication interface operable to communicate with the home television system;
a user input interface operable to receive a user input identifying a video selection; and
at least one module operable to:
transmit a control signal via the communication interface to the home television system, where the control signal is adapted to direct the display of first video information that corresponds to the video selection on the first screen of the home television system.

2. The portable computer according to claim 1, further comprising a video display, and wherein the at least one module is operable to, after receiving the user input identifying the video selection:
retrieve via the communication interface second video information that corresponds to the video selection; and
display the second video information on the video display.

3. The portable computer according to claim 1, wherein the at least one module is operable to receive media guide information from the home television system via the communication interface, and the user input identifying the video selection is based on the media guide information.

4. The portable computer according to claim 1, wherein the communication interface of the portable computer is operable to communicate with the home television system remotely via the Internet.

5. The portable computer according to claim 1, wherein the communication interface of the portable computer is operable to communicate with the home television system directly.

6. The portable computer according to claim 2, where prior to retrieval via the communication interface, the second video information is adapted for the portable computer video display.

7. The portable computer according to claim 6, where the first video information is adapted for the home television system in a manner different from the manner in which the second video information is adapted for the portable computer video display.

8. The portable computer according to claim 7, where the second video information is adapted for the portable computer video display by, at least in part, transcoding the second video information with a set top box of the home television system.

9. The portable computer according to claim 1, wherein the control signal is adapted to be received by set top box circuitry.

10. The portable computer according to claim 9, wherein the at least one module is operable to retrieve video information via the set top box circuitry.

11. The portable computer according to claim 1, wherein:
the user input interface is operable to receive a user input identifying a video storage selection; and
the at least one module, in response to the video storage selection, is operable to direct delivery of third video information to a storage system of at least one of the home television system and/or the portable computer, where the third video information and the storage system correspond to the video storage selection.

12. The portable computer according to claim 11, where the storage system is located capable of being plugged into a media playing device.

13. A portable computer that interacts with a multimedia sourcing system, the multimedia sourcing system adapted to provide multimedia information to a home television system, the portable computer comprising:
a communication interface operable to:
receive media guide information, the media guide information identifying a plurality of media elements; and
communicate with the home television system;
a user interface operable to:
present the received media guide information to a user;
receive a first user input identifying a first selected media element from the plurality of media elements; and receive a second user input identifying a second selected media element from the plurality of media elements; and at least one module operable to:

transmit one or more control signals via the communication interface, where the one or more control signals are adapted to trigger delivery of the first selected media element from the multimedia sourcing system to the home television system and trigger delivery of the second selected media element from the multimedia sourcing system to the portable computer.

14. The portable computer according to claim 13, wherein the at least one module is operable to utilize the user interface to display a video portion of the second selected media element.

15. The portable computer according to claim 13, wherein:
the user interface is operable to receive a media swapping command; and
the at least one module is operable to, in response to a received media swapping command, actuate swapping of the first selected media element and the second selected media element between the home television system and the portable computer.

16. The portable computer according to claim 13, where the portable computer is a laptop.

17. The portable computer according to claim 13, where the portable computer, the multimedia sourcing system and the television system are located at three separate premises.

18. A laptop computer that interacts with a home television system, the laptop comprising:
a video display;
a user input interface operable to receive a user input indicative of a desire to view home television system setting information;
a communication interface operable to receive home television system setting information; and
at least one module operable to display received home television system setting information on the video display.

19. The laptop computer according to claim 18, wherein the at least one module is operable to transmit a control signal via the communication interface, where the control signal is adapted to cause modification of a home television system setting.

20. The laptop computer according to claim 18, wherein:
the user input interface is operable to receive a user input identifying a video selection; and
the at least one module is operable to transmit a second control signal via the communication interface, where the second control signal is adapted to trigger display of first video information corresponding to the video selection on a screen of the home television system.

21. The laptop according to claim 20, wherein the at least one module is operable to, after receiving the user input identifying the video selection:
retrieve, via the communication interface, second video information corresponding to the video selection; and
display the received second video information on the video display.

22. The portable computer of claim 1, where the home television system comprises a television and a set top box.

* * * * *

UNITED STATES PATENT AND TRADEMARK OFFICE
CERTIFICATE OF CORRECTION

PATENT NO. : 7,699,229 B2  Page 1 of 1
APPLICATION NO. : 11/419143
DATED : April 20, 2010
INVENTOR(S) : James D. Bennett and Jeyhan Karaoguz It is certified that error appears in the above-identified patent and that said Letters Patent is hereby corrected as shown below:

Column 16, line 53 delete "located".

Signed and Sealed this

Seventh Day of December, 2010

David J. Kappos
*Director of the United States Patent and Trademark Office*